United States Patent
Hedin et al.

(10) Patent No.: US 9,827,612 B2
(45) Date of Patent: Nov. 28, 2017

(54) METHOD OF MAKING A CEMENTED CARBIDE

(71) Applicant: SANDVIK INTELLECTUAL PROPERTY AB, Sandviken (SE)

(72) Inventors: Andreas Hedin, Stockholm (SE); Susanne Norgren, Huddinge (SE); Nina Sjodahl, Stockholm (SE); Jose Garcia, Stockholm (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 570 days.

(21) Appl. No.: 14/367,266

(22) PCT Filed: Dec. 19, 2012

(86) PCT No.: PCT/EP2012/076184
§ 371 (c)(1),
(2) Date: Jun. 20, 2014

(87) PCT Pub. No.: WO2013/092733
PCT Pub. Date: Jun. 27, 2013

(65) Prior Publication Data
US 2015/0063930 A1 Mar. 5, 2015

(30) Foreign Application Priority Data
Dec. 21, 2011 (EP) .................. 11194820

(51) Int. Cl.
  B22F 3/12 (2006.01)
  B22F 8/00 (2006.01)
  C22C 29/02 (2006.01)
  B22F 9/04 (2006.01)
  B23B 51/00 (2006.01)
  B23C 5/10 (2006.01)
  B22F 5/00 (2006.01)

(52) U.S. Cl.
  CPC ............. *B22F 8/00* (2013.01); *B22F 3/12* (2013.01); *B22F 9/04* (2013.01); *B23B 51/00* (2013.01); *B23C 5/10* (2013.01); *C22C 29/02* (2013.01); *B22F 2005/001* (2013.01); *B22F 2009/041* (2013.01); *B22F 2009/043* (2013.01); *B22F 2302/10* (2013.01); *B22F 2302/15* (2013.01); *B22F 2303/01* (2013.01); *B22F 2303/05* (2013.01); *B22F 2998/00* (2013.01); *B22F 2998/10* (2013.01); *B23B 2222/28* (2013.01); *B23C 2222/28* (2013.01); *Y02P 10/24* (2015.11); *Y02W 30/541* (2015.05); *Y10T 407/27* (2015.01)

(58) Field of Classification Search
None
See application file for complete search history.

(56) References Cited

U.S. PATENT DOCUMENTS

| 3,595,484 A | 7/1971 | Barnard et al. |
| 4,466,945 A | 8/1984 | Cheney et al. |
| 6,210,632 B1 | 4/2001 | Ostlund et al. |
| 6,299,658 B1 * | 10/2001 | Moriguchi ............. C22C 29/02 407/119 |
| 2007/0282068 A1 * | 12/2007 | Kauppi ................. B22F 1/0059 525/98 |
| 2010/0150769 A1 | 6/2010 | Weinl et al. |

FOREIGN PATENT DOCUMENTS

| EP | 0665308 A1 | 8/1995 |
| EP | 1526189 A1 | 4/2005 |
| EP | 1022350 A2 | 7/2007 |
| EP | 0913489 B1 | 3/2009 |
| JP | H1-301835 A | 12/1989 |
| JP | H10-176234 A | 6/1998 |
| JP | H11-335769 A | 12/1999 |

OTHER PUBLICATIONS

Dassel JC et al: "Applications for zing-reclaimed powders in the cemented carbide industry", Metal Powder Report, MPR Publishing Services, Shrewsbury, GB, vol. 43, No. 7-8, Jul. 1, 1988, pp. 457-460.
Totolidis D et al: "On some properties of WC-Co Powders Recycled by the Zinc Process", ATB Mettalurgie 1987, vol. 27, No. 2-3, 1987, pp. 61-67.

* cited by examiner

*Primary Examiner* — Jessee Roe
*Assistant Examiner* — Ngoclan T Mai
(74) *Attorney, Agent, or Firm* — Corinne R. Gorski

(57) ABSTRACT

The present invention relates to a method of making a cemented carbide comprising mixing in a slurry a first powder fraction and a second powder fraction, subjecting the slurry to milling, drying, pressing and sintering. The first powder fraction is made from cemented carbide scrap recycled using the Zn recovery process, comprising the elements W, C, Co, and at least one or more of Ta, Ti, Nb, Cr, Zr, Hf and Mo, and the second powder fraction comprising virgin raw materials of WC and possibly carbides and/or carbonitrides of one or more of Cr, Zr, W, Ta, Ti, Hf and Nb. The first powder fraction is subjected to a pre-milling step, prior to the step of forming the slurry, to obtain an average grain size of between 0.2 to 1.5 μm.

11 Claims, No Drawings

METHOD OF MAKING A CEMENTED CARBIDE

RELATED APPLICATION DATA

This application is a §371 National Stage Application of PCT International Application No. PCT/EP2012/076184 filed Dec. 19, 2012 claiming priority of EP Application No. 11194820.4, filed Dec. 21, 2011.

The present invention relates to a method of making a cemented carbide using recycled gamma phase containing cemented carbide.

BACKGROUND

The ability to recycle cemented carbide scrap is of great interest since the raw material used when making cemented carbide is expensive. Using recycled cemented carbide will reduce the energy consumption and the environmental impact significantly as compared to using virgin raw materials. However, some cemented carbide products cannot be made from recycled cemented carbide without sacrificing product quality compared to when virgin raw materials is used.

Recycling of cemented carbides is usually done by metallurgical or chemical means, e.g. by the zinc recovering process, electrolytic recovery and, extraction or oxidation. In the Zn recovery process, sometimes also called PRZ (process recycled zinc), the cemented carbide scrap is immersed into molten zinc in an electrical furnace. The zinc is then distilled at a certain temperature and is thus removed from the furnace. The remaining powder comprises the WC and the binder metal, usually cobalt, separated from each other. This is described in e.g. U.S. Pat. No. 3,595,484.

Some cemented carbide grades comprises a gamma phase comprising cubic carbides, e.g. NbC, TiC and TaC. The grain size of this gamma phase has an impact on the final properties of the material. Hence, it is important to control the grain growth during sintering for the gamma phase in order to avoid abnormal grain growth and gamma phase clustering. One way to control the grain growth is described in EP 1 526 189 A1 where the cubic carbides are pre-alloyed with WC. The composition of the pre-alloyed powder should be as close as possible to the equilibrium composition of the gamma phase at the sintering temperature. This results in a fine grained gamma phase. The drawback of this method is that only virgin raw materials can be used in order to obtain the desired microstructure. When recycling cemented carbides containing gamma phase, the resulting powders can have a composition other than that of the composition at equilibrium at the sintering temperature.

Making cemented carbide having two fractions of WC where the two fractions have different grain sizes, i.e. a bimodal WC grain size distribution is known in the art.

EP 0 665 308 A1 describes a cemented carbide having a bimodal WC grain size distribution. The obtained cemented carbide has an increased resistance towards plastic deformation in comparison to a cemented carbide having a normal grain size distribution.

EP 0 913 489 B1 describes a cemented carbide comprising gamma phase having a bimodal WC grain distribution where some of the WC is added as powder recovered by the Zn recovery process. The cubic carbides forming the gamma phase are all added as virgin materials.

One object of the present invention is to obtain a method of making cemented carbide having a fine grained gamma phase using recycled cemented carbide comprising cubic carbides as a raw material.

Another object of the present invention is to make a cemented carbide having a fine grained gamma phase having the same or improved properties compared with a cemented carbide having a fine grained gamma phase made from virgin raw material.

It has been discovered that by pre-milling the PRZ-powder to a fine grain size prior to mixing it with a coarser powder fraction, a cemented carbide having the same or improved properties as compared to cemented carbides made from virgin materials can be achieved.

DETAILED DESCRIPTION OF THE INVENTION

The present invention relates to a method of making a cemented carbide comprising the steps of forming a slurry comprising a milling liquid, binder metal powders, a first powder fraction and a second powder fraction, subjecting the slurry to milling, drying, pressing and sintering, where:
the first powder fraction is made from recycled cemented carbide scrap, comprising the elements W, C, Co, and at least one or more of Ta, Ti, Nb, Cr, Zr, Hf and Mo, and
the second powder fraction comprising virgin raw materials of WC and possibly carbides and/or carbonitrides of one or more of Cr, Zr, W, Ta, Ti, Hf and Nb.

The first powder fraction is made from cemented carbide scrap recycled using the Zn recovery process. The first powder fraction is subjected to a pre-milling step, prior to the step of forming the slurry comprising the milling liquid, binder metal powders, a first powder fraction and a second powder fraction, to obtain a average grain size of between 0.2 to 1.5 µm.

The powder constituting the first powder fraction is made from gamma phase containing cemented carbide which has been recycled by the Zn recovery process which is known in the art. By the Zn recovery process is herein meant that cemented carbide scrap is immersed into molten zinc in an electrical furnace. The zinc then forms an alloy with the metallic binder phase in the cemented carbide, usually cobalt, thus breaking the bond between the binder phase and the carbide. The zinc is then distilled at a certain temperature and is thus removed from the furnace. The remaining product comprises the carbides and the binder phase, usually cobalt, as separate phases. For the purposes of the present invention, all powders made from the Zn recovery process irrespectively of variations in production parameters can be used for the first powder fraction.

The powder constituting the first powder fraction is a powder made from gamma phase containing cemented carbide scrap recovered by the Zn recovery process which has been pre-milled to a pre-determined grain size of from 0.2 to 1.5 µm, preferably from 0.2 to 1.0 µm (FSSS). All grain sizes mentioned herein referring to powders are FSSS if not otherwise specified.

The pre-milling is suitably made by forming a slurry which is suitably milled in a ball mill or attritor mill for enough time to achieve the desired average grain size of the powder. The milling time varies since it is dependent both on the type of mill used, but also on the quality of the powders that are to be milled. The powder is then milled for a time enough to obtain the desired grain size. Suitable milling times of the first powder fraction are between 50 to 120 h for a ball mill or between 15 to 35 h for an attritor mill.

In one embodiment of the present invention a milling process as described in US 2012/0111976 can be used.

Any liquid commonly used as a milling liquid in conventional cemented carbide manufacturing can be used. The milling liquid is preferably water, alcohol or an organic solvent, more preferably water or a water and alcohol mixture and most preferably a water and ethanol mixture. The properties of the slurry are dependent on the amount of milling liquid added. Since the drying of the slurry requires energy, the amount of liquid should be minimized in order to keep costs down. However, enough liquid need to be added in order to achieve a pumpable slurry and avoid clogging of the system.

Also, other compounds commonly known in the art can be added to the slurry e.g. dispersion agents, pH-adjusters etc.

The first powder fraction can then either be dried or kept in the slurry for further mixing with the second powder fraction.

In one embodiment of the present invention the slurry comprising the pre-milled first powder fraction is dried according to known techniques, in particular spray-drying. The slurry containing the powdered materials mixed with the organic liquid and possibly the organic binder is atomized through an appropriate nozzle in the drying tower where the small drops are instantaneously dried by a stream of hot gas, for instance in a stream of nitrogen, to form agglomerated granules. For small scale experiments, also other drying methods can be used, e.g. pan drying.

The first powder fraction comprises the elements W, C and Co, and at least one or more of the elements Ta, Ti, Nb, Cr, Zr, Hf and Mo. The exact composition is determined by the cemented carbide scrap used. Also small amounts, i.e. usually less than 1 wt %, of other elements can be present, e.g. binder metals such as Fe and Ni, Zn originating from the Zn recovery process, and Al originating from the coating from coated cemented carbide. Also oxygen is present, suitably in an amount of from 0.2 to 1.8 wt %.

In one embodiment of the present invention the first powder fraction comprises at least one of Ti, Ta or Nb in an amount above the elements solubility point.

In one embodiment of the present invention the first powder fraction comprises from 70 to 90 wt % W, from 5 to 9 wt % Co, from 1 to 3 wt % Ta, from 0.5 to 3 wt % Ti, from 0.1 to 2 wt % Nb and from 5 to 6 wt % carbon.

The second powder fraction comprises powders that are not produced according to the Zn recovery process, i.e. virgin powders. The second powder fraction comprises WC powder and possibly carbides and/or carbonitrides of one or more of Cr, Zr, W, Ta, Ti, Hf and Nb.

The average grain size of WC in the second powder fraction is suitably between 2 to 12 μm preferably 4 to 8 μm.

In one embodiment of the present invention, the second powder fraction comprises $Cr_3C_2$.

In one embodiment of the present invention, the second powder fraction comprises cubic carbide powders either as separate carbides or pre-alloyed with WC.

In one embodiment of the present invention the cubic carbides powders are added as separate carbides. One or more of NbC, TiC and TaC is added.

In one embodiment of the present invention the cubic carbides powders are added as pre-alloyed with WC, i.e. as (Me,W)C where Me is one or more of Ta, Ti, Nb, Cr, Hf and Zr, preferably one or more of Ta, Ti and Nb.

In yet another embodiment of the present invention a combination of separate cubic carbides and cubic carbides pre-alloyed with WC is added.

In yet another embodiment of the present invention at least part of the second powder fraction is added to the first powder fraction prior to the pre-milling step so that the at least part of the second powder fraction is also milled in the pre-milling step.

In yet another embodiment of the present invention at least part of the second powder fraction is subjected to a separate pre-milling step prior to mixing with the pre-milled first powder fraction.

In yet another embodiment of the present invention no pre-milling is done to the second powder fraction prior to mixing with the pre-milled first powder fraction.

The exact composition of the second powder fraction is determined by the composition of the first powder fraction. The composition of the second powder fraction is adjusted so that the final composition of the first and second powder fraction is what was aimed for.

The binder metal powders can either be a powder of one single binder metal, or a powder blend of two or more metals, or a powder of an alloy of two or more metals. The binder metals are selected from Cr, Mo, Fe, Co or Ni, preferably from Co, Cr or Ni, most preferably Co. The grain size of the added binder metal powders is suitably between 0.5 to 3 μm, preferably between 0.5 to 1.5 μm. The average grain size is often given by the raw material distributor. The amount of binder metal powder which is added separately is dependent on the amount of binder metal present in the first powder fraction. Therefore the amount of binder metal powder added is the amount that is required to achieve the aimed metal binder content in the final product. The total binder metal content in the final product is suitably between 2 to 20 wt %.

The weight ratio between the first and second powder fraction is suitably from 0.25 to 9, preferably from 0.5 to 4, most preferably from 0.8 to 1.2.

The ratio between the average grain size of WC in the second powder fraction and the average grain size of the first powder fraction is suitably between 5 to 40, preferably between 5 to 25.

The metal binder powder, the first and second powder fraction, and possibly an organic binder are suitably mixed by a milling operation, either in a ball mill or attritor mill. The milling is suitably made by first forming a slurry comprising metal binder powder, the first and second powder fraction, and possibly an organic binder. Then the slurry is suitably milled in a ball mill or attritor mill to obtain a homogenous slurry blend.

In one embodiment of the present invention, the first powder fraction has been dried prior to mixing with the second powder fraction, preferably the first powder fraction is in the form of dried agglomerates obtained by spray drying. The second powder fraction is then mixed with the first powder fraction, being either in the form of dry powders or as a slurry. The metal binder powder, possibly the organic binder and milling liquid is also added so that a slurry is formed with all constituents.

Any liquid commonly used as a milling liquid in conventional cemented carbide manufacturing can be used, i.e. the same liquids as has been listed for the pre-milling of the first powder fraction above is also suitably for this.

An organic binder is also optionally added to the slurry in order to facilitate the granulation during the following spray drying operation but also to function as a pressing agent for any following pressing and sintering operations. The organic binder can be any binder commonly used in the art. The organic binder can e.g. be paraffin, polyethylene glycol (PEG), long chain fatty acids etc. The amount of organic binder is suitably between 15 and 25 vol % based on the total dry powder volume, the amount of organic binder is not included in the total dry powder volume.

The slurry is subsequently dried using some of the common techniques as described for the pre-milled powder.

Green bodies are subsequently formed from the dried powders/granules by a pressing operation such as uniaxel pressing, multiaxel pressing etc.

The green bodies formed from the powders/granules made according to the present invention, is subsequently sintered according to any conventional sintering methods e.g. vacuum sintering, Sinter HIP, spark plasma sintering etc.

In one embodiment of the present invention, the cemented carbide is sintered so that a gradient is formed thus creating a surface zone which is cobalt enriched and free from gamma phase. This is usually done by incorporating carbonitrides as raw materials.

In one embodiment of the present invention, the cemented carbide is sintered so that no gradient is formed, i.e. without any addition of nitrogen or sintered in with $N_2$ counterpressure.

The final composition of the cemented carbide is determined by its specific use. A typical composition for a cemented carbide used in a cutting tool can comprise WC, and from 4.5 to 12 wt % Co, from 1 to 5 wt % Ta, from 1 to 5 wt % Ti and from 0.2 to 5 wt % Nb.

The cemented carbide can be used for any type of cutting tool, wear parts, or other types of common applications for cemented carbides.

By cutting tool is herein meant an insert, end mill or drill.

In one embodiment of the present invention the cemented carbide tools made according to the above, is coated with a wear resistant coating using CVD or PVD-technique.

In one embodiment of the present invention a CVD coating is deposited comprising a first TiCN layer deposited by MTCVD and a second $\alpha$-$Al_2O_3$ layer deposited by CVD. Possibly an outermost colour layer for wear detection, e.g. a TiN layer, can also be deposited.

The coating can also be subjected to additional treatments, such as brushing, blasting etc.

The present invention also discloses a cemented carbide cutting tool made according to the method described above.

Example 1 (Invention)

A powder made from gamma phase containing cemented carbide scrap recycled through the Zn recovery process with the composition in wt % as shown in Table 1 was pre-milled in a ball mill for 100 hours. Grain size after pre-milling was 0.7 µm measured using a laser diffraction equipment called Microtrac 3000S, which was run in absorption mode and the measurement was carried out in water, i.e. the powder was in the form of a slurry.

TABLE 1

|  | Co | Ta | Ti | Nb | Cr |
| --- | --- | --- | --- | --- | --- |
| First fraction | 8.80 | 2.25 | 1.66 | 0.64 | 0.08 |
|  | Fe | Ni | C | O | N |
| First fraction | 0.05 | 0.02 | 5.75 | 0.24 | 0.06 |

The pre-milled fraction was mixed with a fraction of virgin WC raw material with a grain size of 5 µm (FSSS) and virgin cubic carbide powders of $(Ti_{0.85}W_{0.15})C$, $(Ta_{0.8}Nb_{0.2})C$ and $Ti(C_{0.5}N_{0.5})$ were added as separate carbides together with a binder metal Co powder in amounts in wt % as shown in Table 2 to match a resulting overall element composition in wt % as shown in Table 3.

TABLE 2

| First powder fraction | WC (second powder fraction) | Ratio first/second powder fraction | Co | $(Ti_{0.85}W_{0.15})C$ | $(Ta_{0.8}Nb_{0.2})C$ | $Ti(C_{0.5}N_{0.5})$ |
| --- | --- | --- | --- | --- | --- | --- |
| 48.3 | 44.5 | 1.1 | 3.3 | 1.4 | 1.9 | 0.6 |

TABLE 3

| W | Co | Ta | Ti | Nb | C | O | N |
| --- | --- | --- | --- | --- | --- | --- | --- |
| 80.8 | 7.5 | 2.7 | 1.8 | 0.4 | 6.24 | 0.5 | 0.09 |

An organic binder being polyethylene glycol was also added in an amount of 2 wt %, the amount of organic binder is not included in the total dry powder volume. The total material volume was mixed by a milling operation for 12 hours using a ball mill forming a homogenous slurry blend. The slurry was subsequently dried in a spray-dryer to a ready to press powder.

Cemented carbide blanks were pressed in CNMG120408 ISO insert geometry from the produced ready-to-press powder and sintered in a 40 mbar Argon atmosphere at a temperature of 1450° C. The coercivity and the specific magnetic saturation were measured using a Foerster Koerzimat CS1.096. The sintered inserts had a coercivity value of 13.3 kA/m according to DIN ISO 3326, and a specific magnetic saturation value of 12.51 $\mu T \cdot m^3 \cdot kg^{-1}$. The sintered inserts obtained a 25 µm gamma phase free, cobalt enriched, surface zone.

The inserts were face ground and edge rounded to a cutting edge radius of 50 µm and coated with a CVD coating consisting of a 11 µm layer of MTCVD-TiCN followed by a 5 µm layer of $Al_2O_3$ and a 1-1.5 µm TiN layer. The TiN layer was removed from the rake face by a wet blasting operation.

Example 2 (Prior Art)

A virgin WC raw material with a grain size of 5 µm, a pre-alloyed cubic carbide raw material (Ta, Ti, Nb, W)(C,N) having a weight fraction of Ta/Ti/Nb/W being 31/20/5/34 and Co powder were mixed to match a resulting overall element composition in wt % as shown in Table 4. An organic binder being polyethylene glycol was also added in an amount of 2 wt %, the amount of organic binder is not included in the total dry powder volume. The total material volume was mixed by a milling operation for 12 hours using a ball mill forming a homogenous slurry blend. The slurry was subsequently dried in a spray-dryer to a ready-to-press powder.

TABLE 4

| W | Co | Ta | Ti | Nb | C | O | N |
|---|---|---|---|---|---|---|---|
| 81.4 | 7.5 | 2.7 | 1.8 | 0.4 | 6.04 | 0.04 | 0.09 |

Cemented carbide blanks were pressed in CNMG120408 ISO insert geometry from the produced ready to press powder and sintered under the same conditions as in Example 1. The coercivity and the specific magnetic saturation were measured using a Foerster Koerzimat CS1.096. The sintered inserts had a coercivity value of 13.2 kA/m, according to DIN ISO 3326, and a specific magnetic saturation value of 13.01 $\mu T \cdot m^3 \cdot kg^{-1}$. The sintered inserts obtained a 25 μm gamma phase free, cobalt enriched, surface zone.

The inserts were face ground, edge rounded and coated in the same way as in Example 1.

Example 3 (Comparative)

A virgin WC raw material with a grain size of 5 μm, a binder metal Co powder and a PRZ material that have been recycled according to the zinc treatment method with a composition as shown in Table 1 and virgin cubic carbide powders of $(Ti_{0.85}W_{0.15})C$, $(Ta_{0.8}Nb_{0.2})C$ and $Ti(C_{0.5}N_{0.5})$ were added as separate carbides in amounts in wt % as shown in Table 5. The recycled PRZ powder was not subjected to any pre-milling step The PRZ material had a grain size of 3 μm measured using a laser diffraction equipment called Microtrac 3000S, which was run in absorption mode and the measurement was carried out in water, i.e. the powder was in the form of a slurry. The powders were mixed to match a resulting overall element composition in wt % as shown in Table 6. An organic binder being polyethylene glycol was also added in an amount of 2 wt %, the amount of organic binder is not included in the total dry powder volume. The total material volume was mixed by a milling operation for 12 hours using a ball mill forming a homogenous slurry blend. The slurry was subsequently dried in a spray-dryer to a ready-to-press powder.

TABLE 5

| PRZ | WC | Binder metal Co | $(Ti_{0.85}W_{0.15})C$ | $(Ta_{0.8}Nb_{0.2})C$ | $Ti(C_{0.5}N_{0.5})$ |
|---|---|---|---|---|---|
| 48.3 | 44.5 | 3.3 | 1.4 | 1.9 | 0.6 |

TABLE 6

| W | Co | Ta | Ti | Nb | C | O | N |
|---|---|---|---|---|---|---|---|
| 81.4 | 7.5 | 2.7 | 1.8 | 0.4 | 6.04 | 0.1 | 0.09 |

Cemented carbide blanks were pressed in CNMG120408 ISO insert geometry from the produced ready-to press-powder and sintered under the same conditions as in Example 1. The coercivity and the specific magnetic saturation were measured using a Foerster Koerzimat CS1.096. The sintered inserts had a coercivity value of 13.28 kA/m, according to DIN ISO 3326, and a specific magnetic saturation value of 12.87 $\mu T \cdot m^3 \cdot kg^{-1}$. The sintered inserts obtained a 25 μm gamma phase free, cobalt enriched, surface zone.

The inserts were face ground, edge rounded and coated in the same way as in Example 1.

Example 4

The average grain size of the WC and the cubic carbides (gamma phase) was measured using the mean linear intercept method on three SEM images (4000 magnification) for each sample of the microstructure after sintering. A number of lines were drawn on each image and the cubic carbide grains along all lines were measured. The results are shown in Table 7. The interval represents the interval that 90% of the cubic carbide grains are within.

TABLE 7

| | WC average | Cubic carbides average | Cubic carbides interval |
|---|---|---|---|
| Example 1 (invention) | 1.3 μm | 0.9 μm | 0.8-1.2 μm |
| Example 2 (prior art) | 1.3 μm | 1 μm | 0.8-1.2 μm |
| Example 3 (prior art) | 1.3 μm | 2.3 μm | 1.5-3 μm |

Example 5

The produced inserts of CNMG120408 ISO geometry according to Example 1 and Example 3 were tested in a longitudinal intermittent turning operation based on toughness demanding criteria's in material SS1672, unalloyed steel (DIN Ck 45)

Cutting Data:
Cutting speed: 220 m/min
Feed rate: 0.30 mm
Depth of cut: 3 mm
Coolant: yes The results can be seen in Table 8. Performance was measured in length of edge line wear in average after two cycles in the work piece material over four subsequent tests. Tool life criteria were edgeline breakage and chipping.

TABLE 8

| | Edge line wear |
|---|---|
| Example 1 (invention) | 20% |
| Example 3 (comparative) | 77% |

As can be seen in Table 8 the inserts made according to the present invention performed equally to the comparative examples.

Example 6

The produced inserts of CNMG120408 ISO geometry according to Example 1 and Example 2 and Example 3 were tested in a longitudinal intermittent turning operation with increasing feed rate based on toughness demanding criteria's in material SS1312, low-carbon unalloyed steel (DIN St 37-2)

Cutting Data:
Cutting speed: 80 m/min
Feed rate: 0.15 mm to 0.35 mm
Depth of cut: 1.5 mm
Coolant: yes The results can be seen in Table 9. Performance was measured in time to edge breakage. Tool life criteria were edgeline breakage and chipping.

TABLE 9

|  | Tool life (min) |
| --- | --- |
| Example 1 (invention) | 1.25 |
| Example 2 (comparative) | 1.22 |
| Example 3 (comparative) | 1.05 |

As can be seen in Table 9 the inserts made according to the present invention performed equally or better than the comparative examples.

The invention claimed is:

1. A method of making a cemented carbide comprising the steps of:
   forming a slurry comprising a milling liquid, binder metal powders, a first powder fraction and a second powder fraction; and
   subjecting the slurry to milling, drying, pressing and sintering, wherein the first powder fraction is made from recycled cemented carbide scrap including the elements W, C, Co, and at least one or more of Ta, Ti, Nb, Cr, Zr, Hf and Mo, and the second powder fraction includes raw materials of WC, the first powder fraction being made from gamma phase containing cemented carbide scrap recycled using the Zn recovery process where the first powder fraction is subjected to a pre-milling step, prior to the step of forming the slurry comprising the milling liquid, binder metal powders, the first powder fraction and the second powder fraction, to obtain an average grain size of between 0.2 to 1.5 μm.

2. A method according to claim 1, wherein the second powder fraction includes carbides and/or carbonitrides of one or more of Cr, Zr, Ta, Ti, Hf and Nb.

3. A method according to claim 1, wherein at least part of the second powder fraction is added to the first powder fraction prior to the pre-milling step so that the at least part of the second powder fraction is also milled in the pre-milling step.

4. A method according to claim 1, wherein at least part of the second powder fraction is subjected to a separate pre-milling step prior to mixing with the pre-milled first powder fraction.

5. A method according to claim 1, wherein no pre-milling is done to the second powder fraction prior to mixing with the pre-milled first powder fraction.

6. A method according to claim 1, wherein the ratio between the average grain size of WC in the second powder fraction and the average grain size of the first powder fraction is suitably between 5 to 40.

7. A method according to claim 1, wherein the average grain size of the WC in the second powder fraction is between from 2 to 12 μm.

8. A method according to claim 1, wherein the average grain size of the first powder fraction is from 0.2 to 1.0 μm.

9. A method according to claim 1, wherein a weight ratio between the first powder fraction and the second powder fraction is from 0.25 to 9.

10. A method according to claim 1, wherein an organic binder is added to the slurry.

11. A method according to claim 1, wherein the pre-milling of the first powder fraction is done in a ball or attritor mill.

* * * * *